United States Patent [19]

Chiou et al.

[11] Patent Number: 4,759,315
[45] Date of Patent: Jul. 26, 1988

[54] DEAERATOR TRAY FOR A STEAM BOILER FEEDWATER HEATER SYSTEM

[75] Inventors: Edward H. Chiou, Overland Park; Consalvo Sciubba, Jr., Shawnee, both of Kans.

[73] Assignee: Crane Co., King of Prussia, Pa.

[21] Appl. No.: 902,577

[22] Filed: Sep. 2, 1986

[51] Int. Cl.⁴ ............................................. F22D 1/28
[52] U.S. Cl. ..................................... 122/442; 55/263; 55/444; 55/462; 122/435; 122/438; 122/487; 122/492; 261/111; 261/DIG. 10; 261/DIG. 44
[58] Field of Search ................ 122/412, 414, 417, 435, 122/438, 441, 443, 483, 486–488, 491–492; 60/654, 688; 239/547, 556, 558; 55/261, 263–265, 223, 240, 462, 463–465, 440, 442–444; 261/DIG. 10, DIG. 32, DIG. 76, DIG. 11, 111, 114, DIG.44; 98/115.2

[56] References Cited

U.S. PATENT DOCUMENTS

| | | | |
|---|---|---|---|
| 687,728 | 12/1901 | Cookson | 261/DIG. 10 X |
| 2,194,151 | 3/1940 | Rieger et al. | 122/491 |
| 3,647,191 | 3/1972 | Fordyce | 261/111 |
| 3,803,997 | 4/1974 | Van Raden | 98/115.2 |
| 4,164,399 | 8/1979 | Kannapell | 261/DIG. 44 X |
| 4,261,298 | 4/1981 | McDonald et al. | 122/488 X |
| 4,288,393 | 9/1981 | Sekiguchi et al. | 261/DIG. 10 X |
| 4,601,731 | 7/1986 | Michelson | 55/440 X |

FOREIGN PATENT DOCUMENTS 2142420 1/1985 United Kingdom ................ 122/438

OTHER PUBLICATIONS

*Combustion*, "Deaerating Heater Level Indication", W. A. Huss, Oct. 1963, pp. 38–40.
Chicago Heater Company, Inc., Product Brochure, Bulletin No. D-54 (Exact date unknown).

*Primary Examiner*—Steven E. Warner
*Attorney, Agent, or Firm*—Woodcock, Washburn, Kurtz, Mackiewicz & Norris

[57] ABSTRACT

A tray stack for a boiler feedwater deaerator is provided with a plurality of horizontally spaced troughs arranged in vertically spaced and staggered tiers. Each of the troughs has a generally V-shaped bottom and a pair of outwardly-extending, inclined wall members having notched lower edges. The vertical projected dimension of the inclined wall members is less than the overall depth of the trough such that the distance of travel encountered by the feedwater dropping from the lower edge of the wall members to the next adjacent, underlying trough is maximized, thereby increasing the interactive area of contact between the cascading water and uprising flow of steam. The lower edge of each wall member is preferably notched to enhance dispersion of the falling water, and the wall members also are disposed to positively guide the falling water into the adjacent underlying trough without bypassing the same. Consequently, dead zones within the trough stack are minimized while, at the same time, the configuration of the troughs enables the overall dimensions of the tray stack to be reduced.

14 Claims, 1 Drawing Sheet

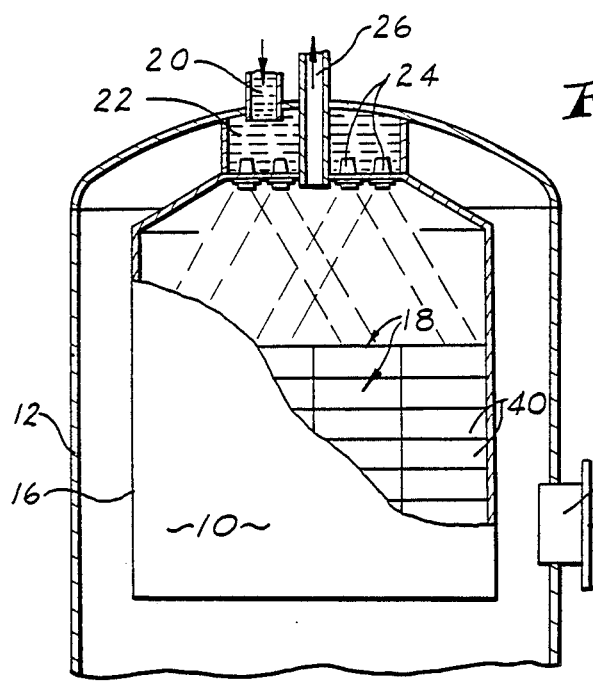
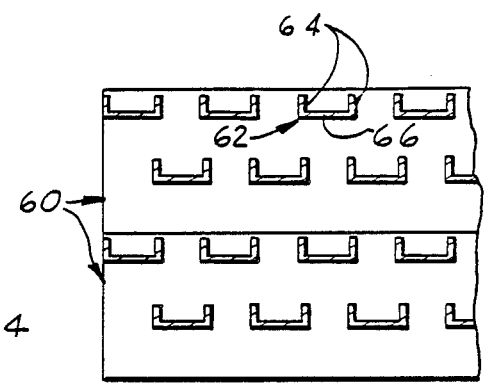
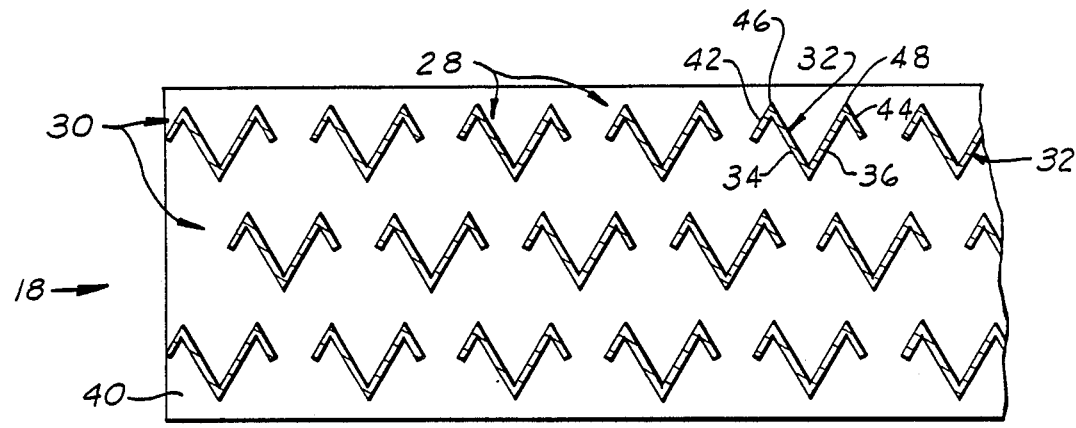
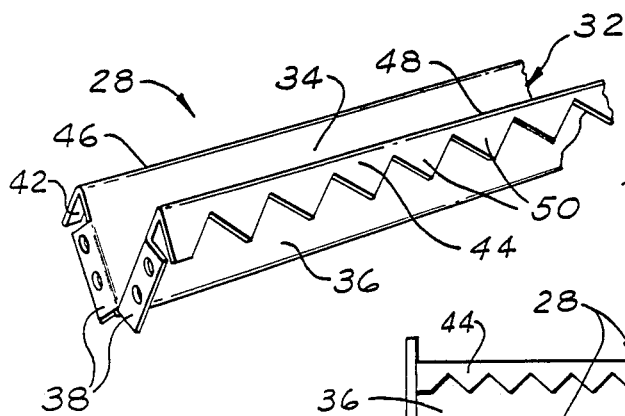
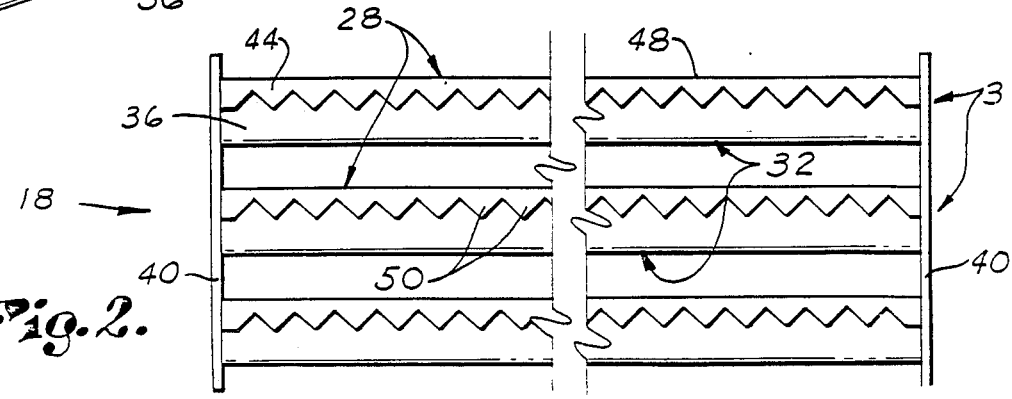

DEAERATOR TRAY FOR A STEAM BOILER FEEDWATER HEATER SYSTEM

BACKGROUND OF THE INVENTION

1. Field of the Invention

This invention relates to a tray assembly for a steam boiler feedwater deaerator. Each trough of the assembly has a V-shaped configuration and inclined, outwardly-extending, notched walls for positively guiding the water to be deaerated toward an area vertically above an underlying trough and promoting more uniform water dispersion in the tray section.

2. Description of the Prior Art

Deaerators have long been used for the removal of corrosion causing gases such as oxygen and carbon dioxide that are dissolved within the feedwater of steam systems. A power plant, for example, could deteriorate rapidly from the ravages of corrosion if substantially complete removal of the dissolved oxygen is not effected. Moreover, use of high pressure cycles in today's steam systems has resulted in an even greater need to protect expensive components in the feed cycle from corrosion.

Certain of the feedwater deaerators in use today utilize a two-stage method for attaining reliable, specififed performance over a varying load range. In the first stage, incoming feedwater is directed through a nozzle to form a thin walled, hollow cone spray pattern within a steam filled vent condensing chamber. In this stage latent heat transfer is instantaneous due to the intimate water-to-steam exposure. As the sprayed feedwater reaches the lower portions of the vent condensing chamber, the water temperature is within about 2° F. of the saturated steam temperature of the counterflowing steam, and a portion of the dissolved oxygen and free carbon dioxide have been removed, due to the effects of Henry's law of partial pressures.

In the second stage of such deaerators, the sprayed feedwater enters a tray assembly or stack. In the past, such tray stacks have comprised tiers of elongated, rectangular troughs which are horizontally spaced in side-by-side relation in each tier, and the tiers are vertically spaced and arranged so that the troughs are in staggered relationship to troughs in adjacent tiers. As such, the feedwater flows into the uppermost troughs and then overflows into underlying troughs, in a generally downward, zig-zag path through a countercurrent, uprising flow of pure steam. In this stage, the water immediately reaches saturation temperature such that the counterflowing steam can effectively scrub and remove the final traces of oxygen and carbon dioxide. The water leaving the lowermost portions of the tray stack is "stripped" by the purest stream that enters the deaerator, whereupon the water then flows into a storage receptacle for later reintroduction into the steam boiler cycle.

It has been found that while the rectangular deaerator trays referenced hereinabove are entirely satisfactory for use in many types of installations, occasionally situations are encountered wherein it is necessary to reduce dissolved oxygen levels in the feedwater exiting the deaerator to values difficult to attain with rectangular trays. The configuration of some types of rectangular troughs is such to cause water overflowing the top edges of the troughs to travel exteriorly down the vertical sidewalls of the troughs and then move in clinging fashion toward the center of the horizontal trough bottom, due to the surface tension of the feedwater as well as the adhesion of the feedwater droplets to the bottom of the trough. The droplets often remain momentarily near the center of the trough bottom underside, and then fall vertically toward the space between the underlying troughs thereby effectively bypassing an entire tier of troughs and instead falling into the troughs of the second underlying tier. As a consequence, it is somewhat difficult to attain extremely low dissolved oxygen levels in the feedwater exiting the second stage.

In the past, certain deaerators have been provided with rectangular troughs having sidewalls which extend beneath the trough bottom, in an attempt to insure that the individual feedwater droplets do not cling to the underside of the trough bottom. In some cases, the vertical sidewalls have been provided with a serrated edge to assist in dispersing the feedwater. However, there is still a need in the art for use in certain installations of a deaerator to provide more complete removal of the dissolved oxygen in the feedwater to insure that the steam system is exposed to the least amount of corrosive gases.

SUMMARY OF THE INVENTION

The deaerator tray of the present invention insures effective, efficient distribution of the overflowing water from each trough into the next adjacent underlying trough, so that overall removal of the dissolved oxygen in the feedwater exiting the deaerator is substantially enhanced. In more detail, the tray assembly of the instant invention comprises an elongated, transversely V-shaped trough and a pair of outwardly-extending, flat wall members connected to opposite trough upper edges. The wall members are inclined relative to vertical and extend downwardly from the uppermost trough edge toward an area vertically above the trough of the underlying tray tier, such that feedwater overflowing the trough is guided downwardly along the upper surface of the flat walls and does not fall from the tray assembly until the water is directly over the underlying trough area. Consequently, bypassing of the troughs is avoided in order to increase the effective amount of time available for interactive contact between the cascading water and the uprising, countercurrent flow of steam.

Advantageously, the vertical projected dimension of the inclined wall members is less than the overall depth of the respective trough in order to increase the effective area of interactive contact between the uprising flow of steam and the water falling from the lower edge of the wall member toward an underlying trough. Thus, the distance that the water falls after dropping from the inclined wall is greater than is provided with known prior art tray assemblies, and the increased free fall time of the feedwater droplets enchances the removal of the dissolved gases. By increasing the free fall distance, the troughs can be arranged in closer relationship such that the overall depth of the tray stack is substantially reduced.

In a conducted test of the tray assembly of the present invention, the final oxygen contact of the feedwater exiting the lower portions of the deaerator was found to yield approximately a 20% to 60% improvement over a prior art deaerator tested under similar circumstances and having rectangular tray assemblies with sidewalls extending below the tray bottom.

BRIEF DESCRIPTION OF THE DRAWINGS

FIG. 1 is a fragmentary, end sectional view of the tray assembly of the instant invention, showing a plurality of horizontally spaced troughs arranged in tiers that are vertically spaced and offset from one another;

FIG. 2 is a fragmentary, side elevational view of the tray assembly shown in FIG. 1, illustrating the configuration of the notched, inclined wall members;

FIG. 3 is a fragmentary, enlarged, perspective view of a single trough of the present invention;

FIG. 4 is a reduced, end sectional view of a two-stage deaerator with parts broken away for clarity wherein a plurality of tray stacks or assemblies as depicted in FIG. 1 are mounted within a deaerator housing; and FIG. 5 is a fragmentary, end cross-sectional view of a prior art deaerator tray assembly.

DETAILED DESCRIPTION OF THE DRAWINGS

Referring initially to FIG. 4, a deaerator 10 is shown having an outer housing 12 with a lower steam inlet 14. An enclosure 16 within the housing 12 supports a plurality of tray stacks or assemblies 18. Near the top of the deaerator housing 12, an inlet 20 is provided for admitting feedwater to a water box 22. A plurality of nozzles 24 mounted on a bottom of the water box 22 are operable to discharge feedwater from the box 22 and direct the same in a conical pattern downwardly toward the underlying stacks 18. Water flowing through the stacks 18 exits at an open bottom of the enclosure 16, while steam rising through the stacks 18 in countercurrent relationship to the falling feedwater is discharged from the enclosure 16 by means of a vent 26.

Viewing FIG. 1, each of the tray assemblies or stacks 18 comprises a plurality of troughs 28 that are arranged in spaced, parallel, side-by-side relationship in three horizontal tiers 30. Moreover, the tiers 30 are vertically spaced from each other and offset such that each of the troughs 28 is generally centered about a vertical plane equidistant between the two adjacent, overlying troughs 28, and good water dispersion and tray performance are attained.

As shown in FIGS. 1-3, each of the troughs 28 includes an elongated channel 32 comprised of a pair of inclined, flat bottom portions 34, 36. The portions 34, 36 are interconnected at their lower edges and present a generally V-shaped configuration transverse to the longitudinal axis of the trough 28. Additionally, as shown in FIG. 3, a pair of brackets 38 are fixedly interconnected to the end of the trough 28 in order to provide structure for mounting the troughs 28 on respective end plates 40 of the tray stack 18 (see FIG. 2).

Each of the troughs 28 also includes a pair of flat, elongated, inclined wall members 42, 44 integrally connected to an upper weir edge 46, 48 of the trough bottom portions 34, 36, respectively. In preferred forms of the invention, each of the wall members 42, 44 has a notched lower edge presenting a plurality of pointed, liquid guiding extensions 50.

Advantageously, each of the troughs 28 can be formed from a single sheet of material and bent to a degree such that the wall member 42 is generally parallel to the bottom portion 36, and the wall member 44 is generally parallel to the bottom member 34. The wall members 42, 44, as well as the bottom portions 34, 36 are each inclined to form an acute angle such that good deaeration results can be attained.

As shown in FIG. 1, each of the wall members 42, 44 is of a width such that the vertical projected dimension of the wall members 42, 44 is less than the depth of the trough 28. That is, the lower tip of each of the extensions 50 is above the lowermost interconnected edges of the bottom portions 34, 36. As such, it can be appreciated that the effective area of interactive contact between the steam uprising through the deaerator 10 and the water falling from the tip of the extensions 50 is maximized in order to increase the degree of deaeration of the cascading water.

In use of the deaerator 10, a quantity of feedwater to be deaerated is introduced through the inlet 20 and into the water box 22. The spray nozzles 24 then direct the feedwater in a conical pattern toward the underlying stacks 18. Subsequently, the troughs 28 of the uppermost tier 30 fill with feedwater until the latter overflows the upper weir edges 46, 48, whereupon the overflowing water travels down the wall members 42, 44 and disengages the latter to free fall to the underlying tier 30 of troughs 28.

The inclined nature of the wall members 42, 44, in cooperation with the triangularly-shaped extensions 50, positively guide the feedwater into the underlying trough 28. Generally, the feedwater tends to follow the extensions 50 downwardly toward the bottom of the latter rather than drop from the wall members 42, 44 at a top portion of the notches. Also, the extensions 50 have been found to break the flow of water into finer droplets than would otherwise be possible.

As shown in FIG. 1, the lowermost tip of each of the extensions 50 is disposed vertically above one of the underlying troughs 28, and consequently the latter are positively overlapped to avoid bypass of the feedwater from any particular one of the troughs 28. Avoidance of tray bypassing by the feedwater streams thus enhances the overall deaeration efficiency of the stacks 18.

As can be appreciated, it is a somewhat difficult proposition to closely examine the interior portions of the deaerator 10 when the latter is in use. However, it is theorized that the improved performance as demonstrated by the present invention is due to the increased free fall area of the feedwater in order to raise the effective interactive area of contact between the uprising steam and the cascading water. Moreover, increased turbulence from the uprising steam under the wall members 42, 44 may create eddies that promote better heating and stripping of the feedwater. In any case, the inclined nature of the members 42, 44, in disposition such that the lower tip of each extension 50 is vertically above one of the underlying troughs 28, insures that the feedwater does not bypass any of the troughs 28 during its downward, cascading path of travel.

A typical tray structure found in prior art deaerators is illustrated in FIG. 5. As shown, a pair of tray stacks 60 each include a plurality of staggered, spaced, elongated troughs 62 having vertical sidewalls 64 and a horizontal bottom 66. However, it has been found that feedwater overflowing from the troughs 62 occasionally adheres in droplet form to the underside of the bottom 66 and drops from the latter near the center of the trough 62, so that the next adjacent, underlying trough 62 is somewhat bypassed.

We claim:

1. A deaerator tray assembly for countercurrent contact of steam system feedwater with uprising a steam vapor, comprising:

a plurality of horizontally elongated troughs for receiving a quantity of said feedwater to be deaerated, said troughs each having a spaced pair of upper weir edges, said troughs being arranged in spaced, side-by-side relation in horizontal tiers, said tiers being vertically spaced and staggered from each other; and a plurality of flat inclined wall members each one being directly connected to one of said weir edges, said wall members extending outwardly and downwardly from respective weir edges and terminating in a lower edge, the vertical projected dimension of said wall members being less than the depth of respective troughs in order to increase the effective area of interactive contact between the uprising steam and the water falling from said wall member lower edge toward said underlying troughs.

2. The invention of claim 1, wherein said wall members have a notched lower edge presenting a plurality of liquid guiding extensions.

3. The invention of claim 2, wherein said bottom is V-shaped and comprises a pair of flat bottom portions each inclined at an angle from horizontal.

4. The invention of claim 2, wherein said trough has a generally V-shaped bottom.

5. The invention of claim 4, wherein said wall members are inclined at an angle from horizontal.

6. A deaerator tray comprising:

horizontally elongated trough means for receiving a quantity of liquid to be deaerated, said trough means presenting a pair of spaced, elongated, liquid overflow edges; and guide structure for directing the flow of liquid overflowing said edges, said guide structure comprising a pair of flat, elongated inclined wall members each directly connected to a respective one of said liquid overflow edges along the length of the latter, said wall members extending outwardly away from each other and downwardly away from said respective liquid overflow edges, each of said wall members being inclined relative to vertical and terminating in a lower edge to enhance deaeration of said liquid as the latter is guided down said wall members and falls from said lower edge.

7. The invention of claim 6, wherein said pair of flat wall members have notched, lower wall edges, presenting a plurality of liquid guiding extensions.

8. A deaerator tray assembly comprising:

a housing;

a plurality of elongated troughs connected to said housing for receiving a quantity of liquid to be deaerted, said troughs being arranged in spaced, side-by-side relation in horizontal tiers, said tiers being vertically spaced from each other, each of said troughs having a pair of inclined portions with interconnected lower edges, said bottom portions presenting a generally V-shaped configuration transverse to the longitudinal axis of said trough, said bottom portions terminating in an upper weir edge; and a plurality of flat wall members each one being directly connected to one of said weir edges, said wall members extending outwardly and downwardly from respective weir edges and terminating in a lower edge, said lower wall edges disposed vertically above an underlying trough.

9. The invention of claim 8, wherein said lower wall edges are notched, presenting a plurality of liquid guiding extensions.

10. The invention of claim 9, said extensions being V-shaped.

11. A deaerator tray assembly comprising:

a housing;

a plurality of elongated troughs connected to said housing for receiving a quantity of liquid to be deaerated, said troughs being arranged in spaced, side-by-side relation in horizontal tiers, said tiers being vertically spaced from each other, each of said troughs having a pair of inclined portions with interconnected lower edges, said bottom portions presenting a generally V-shaped configuration transverse to the longitudinal axis of said trough, said bottom portions terminating in an upper weir edge; and a plurality of wall members each being connected to one of said weir edges, said wall members extending outwardly and downwardly from respective weir edges and terminating in a lower edge, said lower wall edges disposed vertically above an underlying trough, said lower wall edges being notched, presenting a plurality of generally V-shaped liquid guiding extensions, wherein each of said bottom portions has a longitudinal axis which is flat and is generally parallel to a longitudinal axis of said wall member extending outwardly from said adjacent bottom portion.

12. The invention of claim 11, wherein said wall members are inclined at an angle from horizontal.

13. In a deaerator for countercurrent contact of steam system feedwater with uprising steam vapor, the improvement comprising:

a tray stack for a boiler feedwater deaerator having a plurality of horizontally spaced troughs arranged in vertically spaced and staggered tiers, each of said troughs having a generally V-shaped bottom and presenting a pair of spaced, elongated liquid overflow edges and a pair of outwardly extending, flat inclined wall members each directly connected to a respective one of said liquid overflow edges and terminating in notched lower edges providing a plurality of generally pointed, liquid guiding extensions, the vertical projected dimension of said inclined wall members being less than the overall depth of said trough so that the distance of travel encountered by the feedwater dropping from the lower edge of said wall members to the next adjacent, underlying trough is maximized, thereby increasing the interactive area contact between the cascading water and uprising flow of steam, said lower edge of each said wall member being notched to enhance uniform dispersion of the falling water by dividing the falling water into multiple small streams from said liquid guiding extensions, and said wall members being disposed so that said liquid guiding extensions positively guide the falling water into the adjacent underlying trough without bypassing the same, whereby dead zones within the tray stack are minimized and the configuration of the troughs enables the overall dimensions of the tray stack to be reduced.

14. A method for the removal of corrosion causing gases such as oxygen and carbon dioxide from the feed water of steam systems, which method comprises:

introducing feed water into the upper end of an enclosure containing a plurality of tray stacks, directing the feed water in a conical pattern downwardly toward the underlying tray stacks so that the water flowing down through the stacks exits at an open bottom of the enclosure, concurrently directing steam into the enclosure adjacent the bottom of the stacks for rise of steam through the stacks in countercurrent relationship to the falling feed water and, passing the countercurrent of steam system feed water with uprising steam vapor through a tray stack having a plurality of horizontally spaced troughs arranged in vertically spaced staggered tiers, each of the troughs having a generally V-shaped bottom and presenting a pair of spaced, elonagated liquid overflow edges and a pair of outwardly extending, flat inclined wall members each directly connected to a respective one of said liquid overflow edges and terminating in notched lower edges providing a plurality of generally pointed, liquid guiding extensions, the vertical projected dimension of the inclined wall members being less than the overall depth of the trough so that the distance of the travel encountered by the feed water dropping from the lower edge of the wall members to the next adjacent, underlying trough is maximized, thereby increasing the interactive area contact between the cascading water and uprising flow of steam, the lower edge of each wall member being notched to enhance uniform dispersion of the falling water by dividing the falling water into multiple small streams from the liquid guiding extensions and breaking the flow of water into fine droplets, and the wall members being disposed so that the liquid guiding extensions positively guide the falling water into the adjacent underlying trough without bypassing the same, whereby dead zones within the tray stack are minimized and the configuration of the troughs enables the overall dimensions of the tray stack to be reduced.

* * * * *